UNITED STATES PATENT OFFICE.

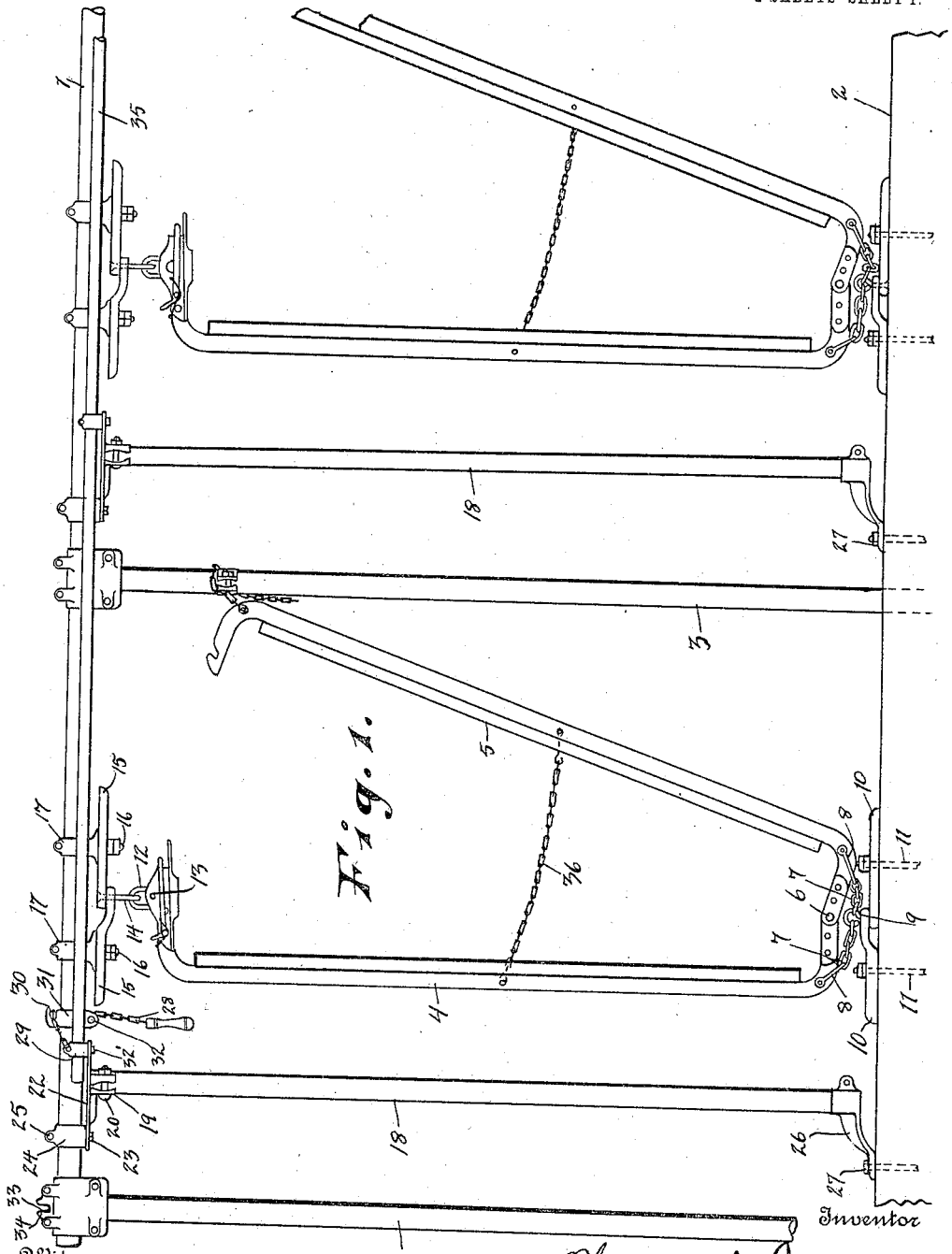

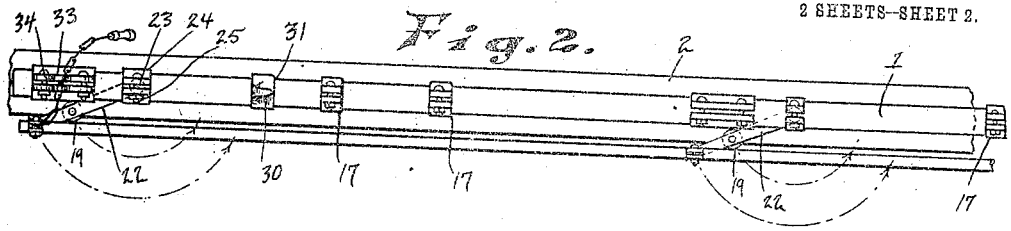
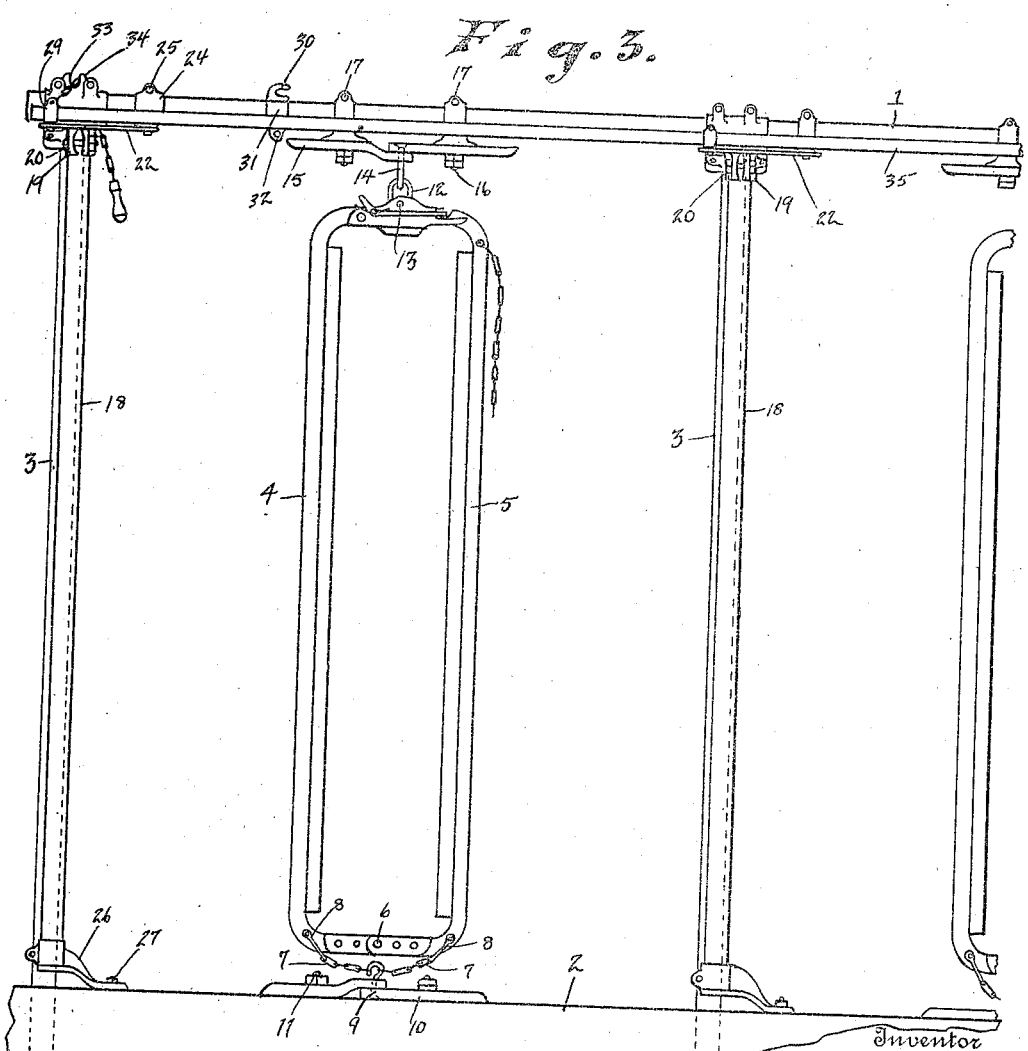

WILLIAM D. JAMES, OF FORT ATKINSON, WISCONSIN.

STANCHION-SUPPORTING FRAME.

1,002,275.  Specification of Letters Patent.  Patented Sept. 5, 1911.

Application filed February 10, 1910. Serial No. 543,037.

*To all whom it may concern:*

Be it known that I, WILLIAM D. JAMES, a citizen of the United States, residing at Fort Atkinson, county of Jefferson, and State of Wisconsin, have invented new and useful Improvements in Stanchion-Supporting Frames, of which the following is a specification.

My invention relates to improvements in stanchion supporting frames, by and from which a series of stanchions are supported in their proper relative position to each other in the ordinary manner, and my invention pertains more especially, among other things, to the device for temporarily closing the space between the several stanchions of the series preparatory to admitting cattle to the stalls, whereby the cattle, when admitted, are prevented from inserting their heads or from passing as they might otherwise do, between the stanchions and instead are caused to insert their necks in their proper places between the vertical bars of the respective stanchions; also whereby when the cattle are in place, the device which is thus temporarily interposed between the stanchions is readily moved from its central position in such a manner that it will in no way interfere with the free movement of the cattle which have been thus properly secured in place.

My invention is further explained by reference to the accompanying drawings, in which—

Figure 1 represents a front view of the same in connection with a series of stanchions and a stanchion supporting frame. Fig. 2 represents a top view, and Fig. 3 is a front view thereof, showing the stanchions in their closed position.

Like parts are referred to by the same reference numerals throughout the several views.

The stanchion supporting frame comprises the upper horizontal member 1, the lower horizontal member 2, and the vertical end and intermediate connecting members 3, 3, said vertical members being rigidly affixed at their respective ends to said upper and lower horizontal members in the ordinary manner. The stanchion comprises the stationary member 4 and the inclinable or pivotally supported member 5, which members are pivotally connected together at their lower ends by the bolts 6 and are connected with the lower or base member 2 by the chains 7, 7, clevises 8, 8, central eye bolt 9, links 10, 10 and bolts 11, 11, while the stationary member 4 of the stanchion is connected with the upper horizontal member 1 by the chain 12, horizontal bolt 13, pivotal bolt 14, links 15, 15, bolts 16, 16, and clamping members 17, 17. Invention in my present application is, however, predicated more especially, as stated, upon the intermediate vertical member 18 and the means for pivotally connecting the same at its respective ends with the upper and lower members 1 and 2. The upper end of said member 18 is connected with the upper horizontal member 1 through the clamping member 19, clamping bolt 20, link 22, link supporting bolt 23, clamping member 24 and clamp retaining bolt 25, while the lower end of said intermediate member 18 is connected with the base member 2 by the bracket 26 and pivotal bolt 27, whereby said member 18 is free to be swung from its intermediate position between the stationary member 4 of the stanchion and the vertical frame member 3 to the position shown in Figs. 2 and 3, or in close proximity to the vertical connecting members 3. It will be understood that preparatory to admitting cattle to the stalls, the stanchions are opened and the vertical members 18 are brought to the intermediate position, in which position the space between the intermediate member and the stanchions upon one side and the vertical member 3 on the other side, is too narrow to permit the cattle to insert their heads, whereby they are caused to insert their heads in the open stanchions in the space between the stationary member 4, and the inclinable member 5 thereof. When, however, all the cattle are in their proper places and the stanchions are closed, the intermediate vertical member 18 is moved, as stated, from the position shown in Fig. 1 to that shown in Figs. 2 and 3, in close proximity to the vertical member 3, whereby ample space is left between the closed stanchion and the intermediate members upon the respective sides for the free movement of the cattle.

Experience has proven that cattle when thus confined in the stables, should be given as great freedom of movement as possible that they may move their heads back upon their respective sides without interference.

which they are unable to do with the stanchion frames as heretofore constructed, while by the device shown, when the intermediate members are removed, the cattle are given nearly the same freedom of movement which they would enjoy were they not secured in place by the stanchion.

28 is a chain by which the intermediate members 18 are secured in place. The chain 28 is connected with the intermediate member 18 through the connecting member 29 and link 22, and when such member is in its intermediate position, shown in Fig. 1, it is secured in place by engaging the chain 28 in the hook 30, said hook being rigidly secured to the horizontal member 1 by the clamping member 31 and clamping bolt 32. When, however, the intermediate member 18 is thrown in the opposite direction, it is thus secured in place by throwing the chain 28 into the recess 33 of the chain retaining plate 34, it being understood that the respective sides of the recess will engage the respective sides of one of the links of the chain, as shown in Figs. 2 and 3, whereby the intermediate member 18 is securely retained in place. For convenience of simultaneously moving all the intermediate bars 18, they are preferably connected together by the horizontal rod or operating member 35, which operating member 35 is connected with all of said links through said connecting member 29 and pivotal bolt 32', whereby it is obvious that when said chains 28 are disengaged from said hooks or recesses, said intermediate member 18 may be shifted in either direction, when it is secured by placing the chain 28 in one or the other of said retaining members, as circumstances require.

To prevent the cattle from passing between the open stanchions when in the position shown in Fig. 1, I preferably connect the respective members 4 and 5 together by a chain 36, said chain being connected at one end with the stationary member 4 and at its opposite end with the inclinable member 5.

Having thus described my invention, what I claim as new, and desire to secure by Letters Patent, is—

1. In a device of the described class, the combination of a plurality of pairs of cattle retaining stanchions, a pair of horizontally arranged stanchion supporting members, a plurality of stationary vertical members permanently connected at their respective ends to said horizontal members, a vertical member pivotally supported at its respective ends from said horizontal stationary members between each pair of cattle retaining stanchions, and means for securing said pivotally supported members at different points of adjustment between said stanchions.

2. In a device of the described class, the combination with a plurality of pairs of cattle retaining stanchions and a pair of horizontally arranged stanchion supporting members, of a plurality of intermediate vertical members pivotally connected at their respective ends with said horizontal stanchion supporting members, means for simultaneously moving said pivotally supported members, and means for securing said members at different points of adjustment between said stanchions.

3. In a device of the described class, the combination of a plurality of stanchions, a pair of horizontally arranged stanchion supporting members, a plurality of movable vertical members, a link pivotally connected at one end to said horizontal stanchion supporting members and connected at its opposite end to said movable vertical members, a horizontal movable member pivotally connected to said links and adapted as it is moved, to simultaneously move the several links and vertical members connected therewith, and means for securing said movable horizontal member at different points of adjustment, all substantially as and for the purpose specified.

In testimony whereof I affix my signature in the presence of two witnesses.

WILLIAM D. JAMES.

Witnesses:
A. M. WEBB,
C. O. CHRIST.